(12) United States Patent
Cutzu et al.

(10) Patent No.: US 9,049,334 B1
(45) Date of Patent: Jun. 2, 2015

(54) DENOISING IMAGES WITH A COLOR MATRIX PYRAMID

(75) Inventors: Florin Cutzu, San Jose, CA (US); Sumit Chawla, San Carlos, CA (US)

(73) Assignee: Foveon, Inc., San Jose, CA (US)

( * ) Notice: Subject to any disclaimer, the term of this patent is extended or adjusted under 35 U.S.C. 154(b) by 150 days.

(21) Appl. No.: 13/405,195

(22) Filed: Feb. 24, 2012

Related U.S. Application Data

(60) Provisional application No. 61/446,281, filed on Feb. 24, 2011.

(51) Int. Cl.
*H04N 9/68* (2006.01)
*H04N 9/083* (2006.01)

(52) U.S. Cl.
CPC ................................. *H04N 9/083* (2013.01)

(58) Field of Classification Search
USPC .......................................... 348/253; 382/167
See application file for complete search history.

(56) References Cited

U.S. PATENT DOCUMENTS

| | | | |
|---|---|---|---|
| 7,426,312 B2 * | 9/2008 | Dance et al. | 382/254 |
| 2006/0029287 A1* | 2/2006 | Hayashi et al. | 382/261 |
| 2009/0245632 A1* | 10/2009 | Ovsiannikov et al. | 382/167 |
| 2009/0285504 A1* | 11/2009 | Li et al. | 382/275 |

OTHER PUBLICATIONS

Burt, P. et al, The Laplacian Pyramid as a Computer Image Code, IEEE Transactions on Communications, Apr. 1983, pp. 532-540.
Donoho, David, "De-Noising by Soft Thresholding," IEEE Transactions on Information Theory, 1995, 37 pages.
Fattal, R. et al., "Multiscal Shape and Detail Enhancements fro Multilight Image Collections," ACM SIGGRAPH, 2007, 7 pages.
Tomasi, C. et al., "Bilateral Filtering for Gray and Color Images," Proceedings of the Sixth International Conference on Computer Vision, 8 pages.
Vora, P. et al., "Trade-offs Between Color Saturation and Noise Sensitivity in Image Sensors," Proceedings of the 1998 International Conference on Image Processing, 1998, pp. 196-200.

\* cited by examiner

*Primary Examiner* — Anthony J Daniels
(74) *Attorney, Agent, or Firm* — Leech Tishman Fuscaldo & Lampl; Kenneth D'Alessandro, Esq.

(57) ABSTRACT

A method for chroma denoising a digital image created in a digital camera includes decomposing the digital image into a plurality of spatial frequency bands. A separate modified color correction matrix is calculated from a color correction matrix associated with the camera for each of the plurality of spatial frequency bands. Each modified color correction matrix is applied to data in its corresponding spatial frequency band to produce color-corrected data in the plurality of spatial frequency bands. The color-corrected data in plurality of spatial frequency bands is combined to produce an output image.

18 Claims, 3 Drawing Sheets

DENOISING IMAGES WITH A COLOR MATRIX PYRAMID

CROSS-REFERENCE TO RELATED APPLICATIONS

This application claims the benefit of U.S. Provisional Patent Application Ser. No. 61/446,281, filed Feb. 24, 2011, the entirety of which is incorporated by reference herein.

BACKGROUND

1. Field of the Invention

The present invention relates to digital images. More particularly, the present invention relates to processing digital images and denoising color digital images.

2. The Prior Art

The raw images created by digital cameras have to be transformed to standard color spaces such as sRGB (or Adobe RGB, or any other standard color space) by applying a color correction matrix. Typically, the color correction matrix increases saturation and consequently amplifies chroma noise. The trade-off between color saturation and noise amplification is well known. See Vora P. and Herley C, *Trade-offs between color saturation and noise sensitivity in image sensors*, Proceedings of the 1998 International Conference on Image Processing (1998). Therefore, to effectively reduce noise in a high ISO image, the noise amplification properties of the color correction matrix must be addressed.

If the color correction matrix is desaturated its condition number decreases and chroma noise amplification is reduced. The drawback of this simple approach is that in order to achieve reasonably low chroma noise in high ISO images, unacceptable levels of desaturation must be tolerated.

Multi-resolution approaches to denoising such as wavelet methods are commonly used in image processing. See, e.g., David Donoho, *De-noising by soft thresholding*, IEEE Trans, on Information Theory, 38(2), pp. 613-627, (1995), In these methods, typically, small coefficients in the high-frequency bands are set to zero.

In Fattal R., Agrawala M., and Rusinkiewicz S., *Multiscale Shape and Detail Enhancement from Multi-light Image Collections*, ACM SIGGRAPH 51 (2007), a multi-scale image decomposition is computed based on the bilateral filter. However, the purpose is not noise reduction.

BRIEF DESCRIPTION

The present method overcomes this limitation and is based on the observation that the human visual system is not sensitive to high spatial frequency color detail and that most image information is conveyed by luminosity edges.

The method of the present invention desaturates more and averages (denoises) less at higher spatial frequencies, therefore better preserving luminosity detail while more aggressively suppressing chroma noise. At the same time, the large-scale structures in the resulting image in the output color space are not desaturated.

Therefore, a raw image has to be decomposed into several frequency bands, and each band processed differently, as explained herein.

According to one aspect of the present invention, a method for chroma denoising a digital image created in a digital camera includes decomposing the digital image into a plurality of spatial frequency bands. A separate modified color correction matrix is calculated from a color correction matrix associated with the camera for each of the plurality of spatial frequency bands. Each modified color correction matrix is applied to data in its corresponding spatial frequency band to produce color-corrected data in the plurality of spatial frequency bands. The color-corrected data in the plurality of spatial frequency bands is combined to produce an output image.

According to another aspect of the present invention, the digital image is decomposed into K frequency bands by creating a sequence of K increasingly smooth images bilateral filtering and downsampling.

According to another aspect of the present invention, calculating modified color correction matrices from a color correction matrix associated with the camera may be performed by deriving the modified color matrices from desaturated color values of a color calibration chart (such as the Macbeth chart) or other color chart. The chart values are transformed from a destination color space to a luminance chrominance color space. The chrominance coordinates are moved towards the neutral point by a desired amount. The luminance chrominance values are transformed to new values in the destination color space, and a color matrix is derived from the new values in the destination color space. Persons of ordinary skill in the art will realize that the chart values can be transformed between a destination color space and a color space other than a luminance chrominance color space to perform the disclosed method within the scope of the present invention.

According to another aspect of the present invention, calculating modified color correction matrices from a color correction matrix associated with the camera may be performed by desaturating the color matrix by taking its N-order root.

BRIEF DESCRIPTION OF THE DRAWING FIGURES

DETAILED DESCRIPTION

Persons of ordinary skill in the art will realize that the following description of the present invention is illustrative only and not in any way limiting. Other embodiments of the invention will readily suggest themselves to such skilled persons.

Figure 1:
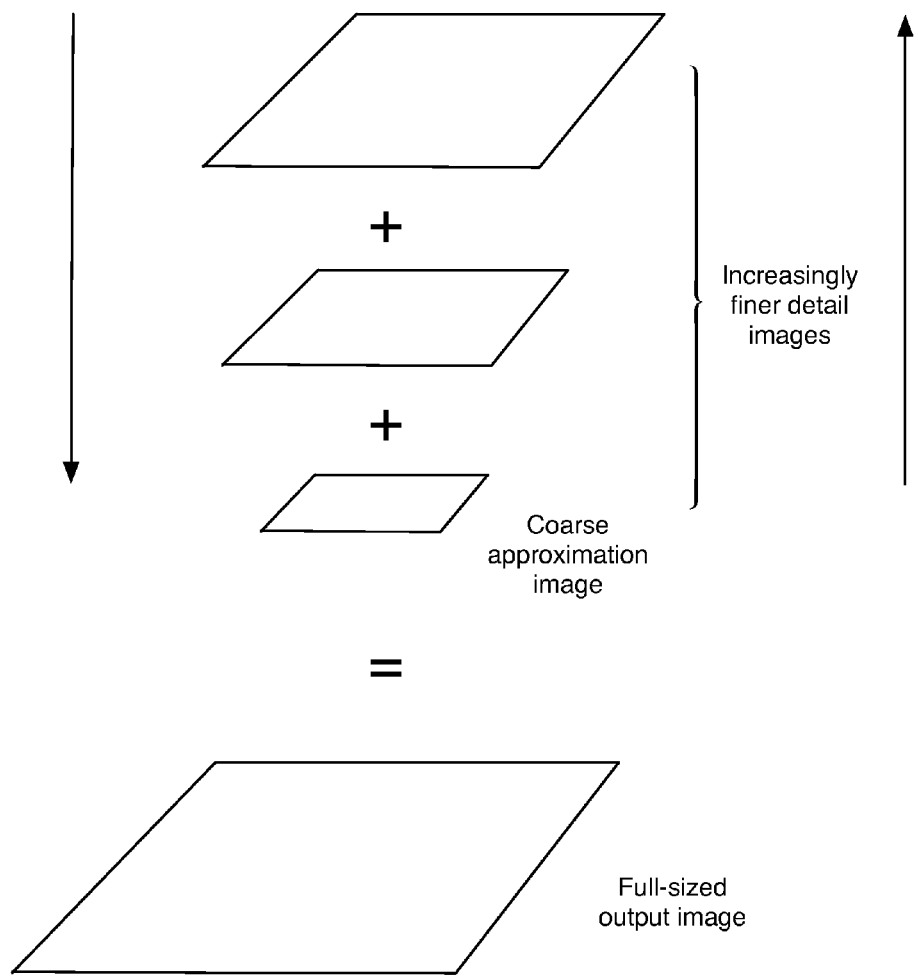
FIG. 1 is a diagram illustrating a method for chroma denoising a digital image according to the present invention.

FIG. 1 gives a simple summary of the method according to the present invention. As illustrated in FIG. 1, the original image is decomposed into several spatial frequency bands. The color saturation is decreased with increasing spatial frequency.

According to the method of the present invention, the image is decomposed into several spatial frequency bands. By analogy with the classical Gaussian pyramid (see, e.g., Burt P. J. and Adelson E. H., *The Laplacian Pyramid as a Compact Image Code*, IEEE Transactions on Communications, 31 (1983)), a bilateral filter pyramid (see, e.g., Tomasi, C. and Manduchi, R., *Bilateral Filtering for Gray and Color Images*, Proceedings of the Sixth International Conference on Computer Vision (1998)) is constructed from a given raw digital camera image in accordance with one aspect of the present invention. For a decomposition of the image into K frequency bands, a sequence of K increasingly smooth images is created by bilateral filtering (BF) and downsampling by a factor of 2($\downarrow$).

$$I_i = \downarrow BF(I_{i-1})$$

where i=1, ..., K and $I_0$ is the original noisy raw image. The detail images are given by upsampling by 2($\uparrow$) and taking differences:

$$D_i = I_{i-1} - \uparrow(\downarrow BF(I_{i-1}))$$

The detail images contain both genuine image detail (edges, texture) as well as noise. The original image can be exactly reconstructed from the coarsest approximation $I_K$ and the sequence of detail images:

$$I_0 = I_K + \sum_{i=1}^{K-1} D_i$$

In simple terms, this section can be roughly summarized as follows: the original image can be expressed as the sum of a smooth, blurry image lacking in fine detail plus a sequence of increasingly fine, sharp, smaller and smaller-scale detail images.

There are two principally different ways of reducing noise in this scheme: high-frequency desaturation and small detail removal (shrinking).

Image filtering for noise reduction is normally performed by discarding the residual image (the difference between the original and the filtered image). The problem with this approach is that one discards not only noise but also high-frequency image structure. This limitation can be overcome according to the present invention by desaturating the residual image instead of discarding it: chroma noise is reduced by desaturating the color matrix as an increasing function of spatial frequency. As a result, high-frequency noise becomes less chromatic and therefore less objectionable. This is a main novelty of the proposed method, and is implemented as follows.

Create a sequence of increasingly saturated versions of the color matrix T. $Q_i$, i=1, ..., K, where $Q_1$ is the identity matrix (maximally desaturated) and $Q_K$ is the original color matrix (minimally desaturated).

The color matrix T for a particular camera (and a particular illuminant) can be desaturated by deriving it from desaturated values of a color calibration chart such as a Macbeth chart. The chart values are transformed from a destination color space to a luminance chrominance color space. The chrominance coordinates are moved towards the neutral point by a desired amount. The luminance chrominance values are transformed to new values in the destination color space, and a color matrix is derived from the new values in the destination color space. In one particular non-limiting example, the chart values are transformed from sRGB to Lab, moving the ab coordinates towards the neutral point by a desired amount, transform back to sRGB, and derive a color matrix from the new sRGB values.

Another option is to desaturate the color matrix by taking its N-order root:

$$Q = T^{\frac{1}{N}}, N \geq 1$$

The degree of desaturation increases with N, and for very large N the identity matrix is obtained.

The desaturated color matrices $Q_i$ are applied to the bilateral filter pyramid, such that the original color matrix (maximum saturation) is applied to the coarsest level, and the maximally desaturated color matrix is applied to the finest detail image.

The result is a sRGB (or any other standard color space) image in which the high-frequency components are selectively desaturated. In the case of an sRGB image:

$$I_{sRGB\ denoised} = Q_K I_K + \sum_{i=1}^{K-1} Q_i D_i$$

Persons of ordinary skill in the art will note that noise and other high frequency image components are not actually removed, only discolored and pushed to the luma channel. In other words, the proposed denoising scheme does not remove any of the luma information of the original image.

Figure 2:
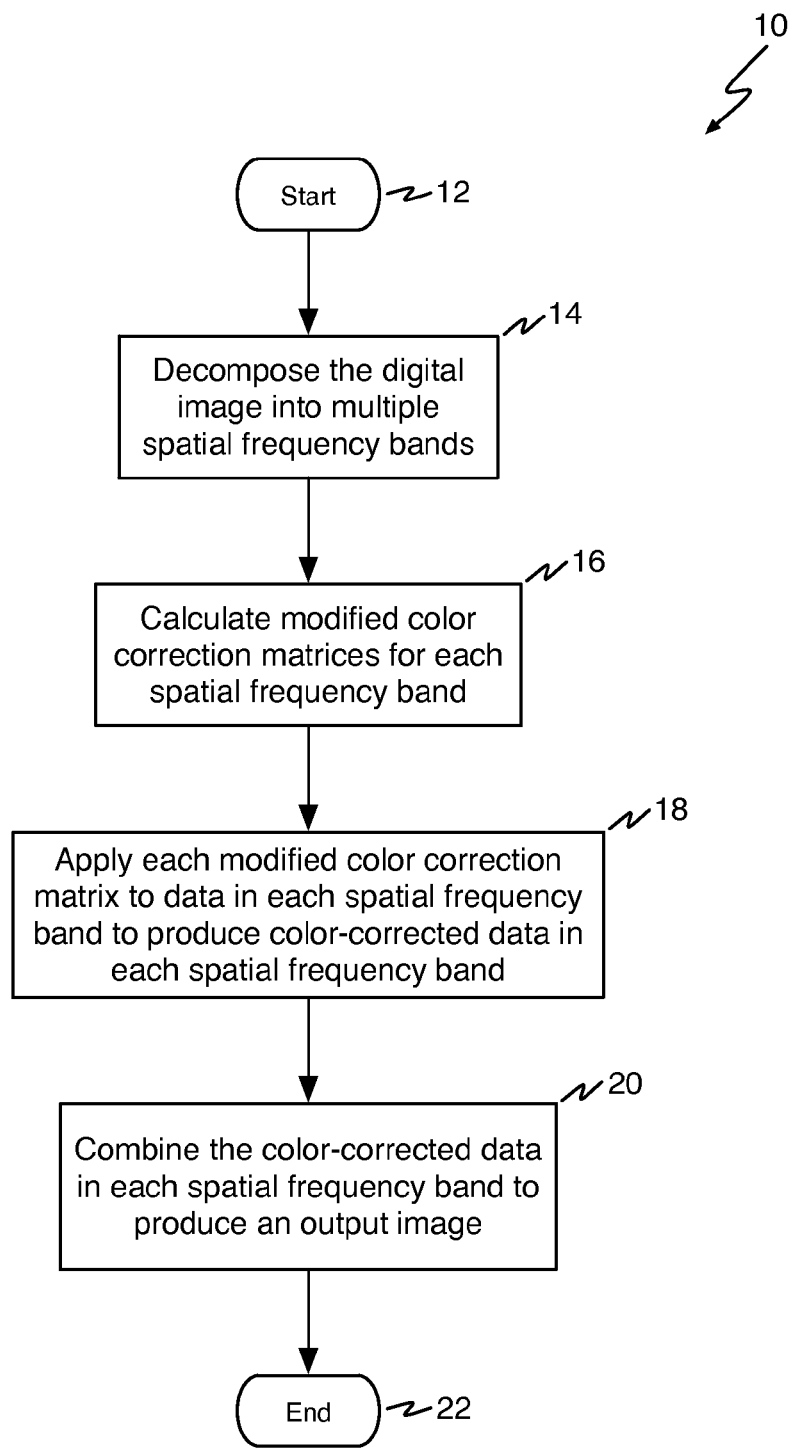
FIG. 2 is a flow diagram illustrating one aspect of the present invention.

Referring now to FIG. 2, a flow diagram shows an illustrative method 10 for chroma denoising a color digital image in accordance with one aspect of the present invention. The method 10 starts at reference numeral 12. At reference numeral 14, the color digital image is decomposed into multiple spatial frequency bands. Next, at reference numeral 16, modified color correction matrices are calculated for each spatial frequency band. Next, at reference numeral 18, each modified color correction matrix is applied to data in each spatial frequency band to produce color-corrected data in each spatial frequency band. Next, at reference numeral 20, the color-corrected data in each spatial frequency band are combined to produce an output color digital image. The method ends at reference numeral 22.

Figure 3:
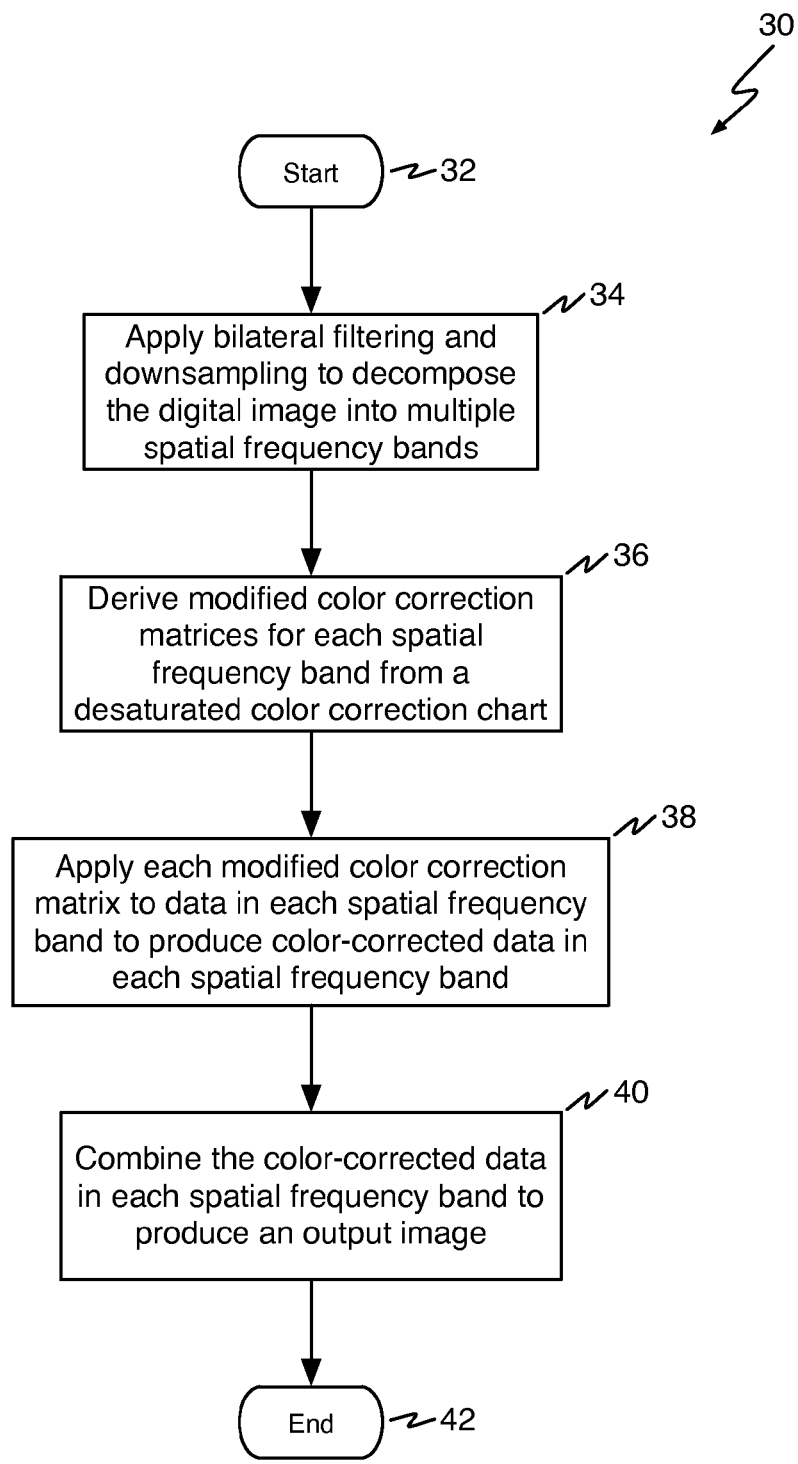
FIG. 3 is a flow diagram illustrating another aspect of the present invention.

Referring now to FIG. 3, a flow diagram shows an illustrative method 30 for chroma denoising a color digital image in accordance with another aspect of the present invention. The method 30 starts at reference numeral 32. At reference numeral 34, the color digital image is decomposed into multiple spatial frequency bands by applying bilateral filtering and downsampling by 2. Next, at reference numeral 36, modified color correction matrices are calculated for each spatial frequency band from desaturated color values of a color calibration chart such as a Macbeth chart. Next, at reference numeral 38, each modified color correction matrix is applied to data in each spatial frequency band to produce color-corrected data in each spatial frequency band. Next, at reference numeral 40, the color-corrected data in each spatial frequency band are combined to produce an output color digital image. The method ends at reference numeral 42.

If desired, the desaturation of high frequencies can be combined with regular denoising, i.e, averaging out small-scale image details. For example, the finest detail image can be further denoised by anisotropic diffusion or any other denoising algorithm. The possible drawback here is oversmoothing resulting in loss of fine image detail.

In the special case of a two-level pyramid, the method reduces to down-sampling and bilateral filtering the original noisy image, upsampling the result, applying the color matrix, and adding back the desaturated residual noise/fine detail from the original noisy image.

Persons of ordinary skill in the art will appreciate that the methods of the present invention are typically performed in a computer running software that implements the processes described herein. Alternatively, the processing may be performed in a camera processor running software or firmware that implements the method described herein. The data from a raw image file stored in the computer or camera or loaded into the computer is accessed by the software. The image data is manipulated as set forth herein and the image from the raw image file is transformed into a chroma denoised output image which is then stored in the computer or camera or downloaded to other devices.

The disclosed denoising method provides several advantages over the prior art. The denoised image has the same luma detail content as the original image. If desired, one can further denoise the finest detail image $D_i$. In addition, the largest scale structures of the image are reproduced at full saturation in SRGB (or other color) space. Smaller scale detail is reproduced with a saturation level inversely proportional to spatial frequency, matching the human visual system's sensitivity to color detail.

The present method is different from the multi-resolution approaches to denoising such as wavelet methods that are commonly used in image processing. In these methods, typically, small coefficients in the high-frequency bands are set to zero. The method of the present invention uses different color matrices in different frequency bands, and keeps the image structure intact in these bands.

The proposed method can be applied to any multi-resolution image decomposition scheme. For example, one can replace the bilateral filter pyramid with a discrete wavelet transform. The fully saturated color matrix is applied to the coarsest approximation, and increasingly desaturated versions of the color matrix to the finer details. If desired, wavelet shrinkage may also be performed for additional noise reduction (but at the cost of destroying image structure).

The method of the present invention is of general application and can be applied to a variety of color image capture devices, including but not limited to Bayer images and to images from multilayer vertical sensors such as the X3 sensor available from Foveon, Inc of Santa Clara, Calif. The Bayer color correction matrix has a much better condition number than the Foveon matrix, but the idea of desaturating the higher frequency image components still applies.

Having described the invention, it is noted that persons skilled in the art can make modifications and variations in light of the above teachings. It is therefore to be understood that changes may be made in the particular embodiments of the inventions disclosed, which are within the scope and spirit of the inventions as defined by appended claims.

What is claimed is:

1. A method for chroma denoising a color digital image created in a digital camera comprising:
    decomposing the color digital image into at least a first spatial frequency band and a second spatial frequency band;
    calculating from a color correction matrix associated with the camera a first modified color correction matrix for the first spatial frequency band and a second modified color correction matrix for the second spatial frequency band;
    applying the first modified color correction matrix to all pixel data in the first spatial frequency band to produce color-corrected data in the first spatial frequency band and applying the second modified color correction matrix to all pixel data in the second spatial frequency band to produce color-corrected data in the second spatial frequency band; and
    combining the color-corrected data in the first spatial frequency band and the color-corrected data in the second spatial frequency band to produce an output color digital image;
    wherein calculating from a color correction matrix associated with the camera a first modified color correction matrix for the first spatial frequency band and a second modified color correction matrix for the second spatial frequency band comprises deriving the first and second modified color matrices from desaturated color values of a color calibration chart.

2. The method of claim 1 wherein the color digital image is decomposed into K frequency bands by creating a sequence of K increasingly smooth images by bilateral filtering and downsampling.

3. The method of claim 1 wherein the color image is decomposed using a discrete wavelet transform.

4. The method of claim 2 wherein a finest detail one of the K images is further denoised.

5. The method of claim 4 wherein the finest detail one of the K images is further denoised using anisotropic diffusion.

6. The method of claim 1 wherein deriving the first and second modified color matrices from a desaturated color calibration chart comprises;
    transforming the color calibration chart values from a destination color space to a luminance chrominance color space;
    moving the chrominance coordinates towards the neutral point by a desired amount;
    transforming the luminance chrominance values to new values in the destination color space; and
    deriving a color matrix from the new values in the destination color space.

7. A method for chroma denoising a color digital image created in a digital camera comprising:
    decomposing the color digital image into a plurality of spatial frequency bands;
    calculating from a color correction matrix associated with the camera a separate modified color correction matrix for each of the plurality of spatial frequency bands;
    applying each modified color correction matrix to all pixel data in its corresponding spatial frequency band to produce color corrected data in the plurality of spatial frequency bands; and
    combining the color corrected data in plurality of spatial frequency bands to produce an output color digital image;
    wherein calculating from a color correction matrix associated with the camera a separate modified color correction matrix for each of the plurality of spatial frequency bands comprises deriving separate modified color correction matrices from desaturated color values of a color calibration chart.

8. The method of claim 7 wherein the color digital image is decomposed into K frequency bands by creating a sequence of K increasingly smooth images by bilateral filtering and downsampling.

9. The method of claim 7 wherein the color image is decomposed using a discrete wavelet transform.

10. The method of claim 8 wherein a finest detail one of the K images is further denoised.

11. The method of claim 7 wherein deriving the modified color matrices from a desaturated color calibration chart comprises;
    transforming the color calibration chart values from a destination color space to a luminance chrominance color space;
    moving the chrominance coordinates towards the neutral point by a desired amount;
    transforming the luminance chrominance values to new values in the destination color space; and
    deriving a color matrix from the new values in the destination color space.

12. The method of claim 7 wherein the finest detail one of the K images is further denoised using anisotropic diffusion.

13. A method for chroma denoising a color digital image created in a digital camera comprising:
- decomposing the color digital image into at least a first spatial frequency band and a second spatial frequency band;
- calculating from a color correction matrix associated with the camera a first modified color correction matrix for the first spatial frequency band and a second modified color correction matrix for the second spatial frequency band;
- applying the first modified color correction matrix to all pixel data in the first spatial frequency band to produce color-corrected data in the first spatial frequency band and applying the second modified color correction matrix to all pixel data in the second spatial frequency band to produce color-corrected data in the second spatial frequency band; and
- combining the color-corrected data in the first spatial frequency band and the color-corrected data in the second spatial frequency band to produce an output color digital image;
- wherein calculating from a color correction matrix associated with the camera a first modified color correction matrix for the first spatial frequency band and a second modified color correction matrix for the second spatial frequency band comprises desaturating the color matrix by taking its N-order root.

14. The method of claim 13 wherein the color digital image is decomposed into K frequency bands by creating a sequence of K increasingly smooth images by bilateral filtering and downsampling.

15. The method of claim 13 wherein the color image is decomposed using a discrete wavelet transform.

16. A method for chroma denoising a color digital image created in a digital camera comprising:
- decomposing the color digital image into a plurality of spatial frequency bands;
- calculating from a color correction matrix associated with the camera a separate modified color correction matrix for each of the plurality of spatial frequency bands;
- applying each modified color correction matrix to all pixel data in its corresponding spatial frequency band to produce color corrected data in the plurality of spatial frequency bands; and
- combining the color corrected data in plurality of spatial frequency bands to produce an output color digital image;
- wherein calculating from a color correction matrix associated with the camera a first modified color correction matrix for the first spatial frequency band and a second modified color correction matrix for the second spatial frequency band comprises desaturating the color matrix by taking its N-order root.

17. The method of claim 16 wherein the color digital image is decomposed into K frequency bands by creating a sequence of K increasingly smooth images by bilateral filtering and downsampling.

18. The method of claim 16 wherein the color image is decomposed using a discrete wavelet transform.

* * * * *